United States Patent
No

(10) Patent No.: US 11,094,143 B2
(45) Date of Patent: Aug. 17, 2021

(54) TRAILER MODE DETERMINATION DEVICE AND METHOD USING GRADIENT

(71) Applicant: Hyundai Kefico Corporation, Gunpo-si (KR)

(72) Inventor: Jin Won No, Seoul (KR)

(73) Assignee: HYUNDAI AUTRON GO., LTD., Seoul (KR)

( * ) Notice: Subject to any disclaimer, the term of this patent is extended or adjusted under 35 U.S.C. 154(b) by 194 days.

(21) Appl. No.: 16/654,464

(22) Filed: Oct. 16, 2019

(65) Prior Publication Data

US 2020/0118353 A1    Apr. 16, 2020

(30) Foreign Application Priority Data

Oct. 16, 2018    (KR) .................. 10-2018-0123318

(51) Int. Cl.

| | |
|---|---|
| F16H 59/48 | (2006.01) |
| F16H 59/52 | (2006.01) |
| B60T 8/17 | (2006.01) |
| H04W 4/02 | (2018.01) |
| G07C 5/00 | (2006.01) |
| G05B 23/02 | (2006.01) |
| G07C 5/08 | (2006.01) |

(52) U.S. Cl.
CPC ............ *G07C 5/006* (2013.01); *B60T 8/1708* (2013.01); *F16H 59/48* (2013.01); *F16H 59/52* (2013.01); *G05B 23/0283* (2013.01); *G07C 5/0816* (2013.01); *H04W 4/027* (2013.01); *F16H 2059/525* (2013.01)

(58) Field of Classification Search
None
See application file for complete search history.

(56) References Cited

U.S. PATENT DOCUMENTS

| | | | |
|---|---|---|---|
| 7,394,354 B2 * | 7/2008 | Yu ..................... | B60D 1/58 |
| | | | 280/442 |
| 8,554,431 B2 * | 10/2013 | Eriksson ............. | F16H 61/0213 |
| | | | 701/65 |

FOREIGN PATENT DOCUMENTS

| | | |
|---|---|---|
| KR | 10-2010-0061148 A | 6/2010 |
| KR | 10-1734245 B1 | 5/2017 |
| KR | 10-1836290 B1 | 4/2018 |

* cited by examiner

*Primary Examiner* — Todd Melton
(74) *Attorney, Agent, or Firm* — Morgan, Lewis & Bockius LLP

(57) ABSTRACT

A trailer mode determination device and method using a gradient is provided that a trailer mode determination method includes: calculating longitudinal acceleration-based gradient of a vehicle and determining whether a calculated value is valid; calculating clutch torque-based gradient and determining whether the calculated value is valid; determining whether the longitudinal acceleration-based gradient is greater than or equal to a predetermined reference gradient; determining whether vehicle speed and vehicle speed change amount are greater than or equal to predetermined values; calculating a difference between the longitudinal acceleration-based gradient (d1) and the clutch torque-based gradient (d2) when the vehicle speed and vehicle speed change amount are greater than or equal to a predetermined value; determining whether gradient difference (d1−d2) exceeds a predetermined normal range; and determining a trailer is mounted and a trailer mode is switch on when the gradient difference (d1−d2) exceeds the normal range.

20 Claims, 3 Drawing Sheets

TRAILER MODE DETERMINATION DEVICE AND METHOD USING GRADIENT

CROSS REFERENCE TO RELATED APPLICATION

The present application claims priority to Korean Patent Application No. 10-2018-0123318, filed Oct. 16, 2018, the entire contents of which is incorporated herein for all purposes by this reference.

BACKGROUND OF THE INVENTION

Field of the Invention

The present invention relates to a trailer mode determination device and method and, more particularly, to a trailer mode determination device and method using a gradient for determining whether a trailer is attached to a vehicle, by using a difference value between an actual gradient (longitudinal acceleration-based gradient) and a theoretical gradient (clutch torque-based gradient) of the vehicle.

Description of the Related Art

When a trailer is attached to a vehicle, driving inertia load of the vehicle increases, and thus, behavior of the vehicle, climbing ability, and fuel efficiency are decreased. Therefore, in order to well maintain good performance of the vehicle, hill climbing ability, and fuel efficiency, it is necessary to quickly determine whether the trailer is attached, and accordingly, control the vehicle by using a shift pattern map which is different from that of a general driving situation.

Conventional methods for determining whether the trailer is attached may be generally divided into two types. One method is to determine whether the trailer is attached or not on the basis of electric signal regarding connection status of a dedicated cable when connecting the trailer to the vehicle with a connector, and the other method is to calculate total vehicle weight so that the vehicle is determined to be in a trailer mode when the total vehicle weight is greater than or equal to a predetermined value.

In the former case where a mounting status of the trailer is determined by the electric signal indicating whether the dedicated cable is connected or not, an immediate determination of whether the trailer is mounted is made possible by using an electric signal output depending on the connection status of the dedicated cable. However, since a separate use of the dedicated cable for the trailer causes an increase in cost, there is a disadvantage in terms of production cost.

Also, in the latter case where the mounting status of the trailer is determined by using the total vehicle weight, since this is a method of identifying a degree of weight change and how much the weight is increased with respect to the base vehicle weight, and comparing the identified information with the base vehicle weight, the trailer may be wrongly determined to be mounted to the vehicle when a large number of passengers are on board and the trailer is not even mounted to the vehicle, thereby rather making worse the performance of the vehicle.

Documents of Related Art (Patent Document 1) Korean Patent No. 10-1836290 "VEHICLE WEIGHT ESTIMATION APPARATUS AND METHOD" (Registration Date: Mar. 2, 2018)

SUMMARY OF THE INVENTION

A technical problem to be solved by the present invention is to provide a trailer mode determination device and method using a gradient in order to eliminate a cost increasing factor due to the using of a separately dedicated cable for a trailer. Also, the technical problem is to determine whether the trailer is attached to a vehicle more accurately than a method of determining whether the trailer is attached by measuring a change in vehicle weight.

According to one aspect of the present invention as a means for solving the problem, a trailer mode determination device using a gradient, the device includes: a vehicle speed detection unit detecting vehicle speed and vehicle speed change amount; a first gradient calculation unit for calculating a longitudinal acceleration-based gradient of a vehicle; a second gradient calculation unit for calculating a clutch torque-based gradient of the vehicle; and a determination controller determining whether a trailer is attached to the vehicle by using information regarding the longitudinal acceleration-based gradient calculated by the first gradient calculation unit and the clutch torque-based gradient calculated by the second gradient calculation unit, wherein when the vehicle speed and vehicle speed change amount detected by the vehicle speed detection unit are equal to or greater than a predetermined value, the determination controller controls shifting of a transmission of the vehicle by using a different shift pattern map depending on a determination result whether the trailer is attached.

Here, the first gradient calculation unit may calculate the longitudinal acceleration-based gradient of the vehicle by multiplying a difference value, calculated between longitudinal acceleration of the vehicle provided by a longitudinal acceleration measurement unit and average wheel speed change amount of the vehicle provided by a wheel speed measurement unit, by 100 and dividing the multiplied result by 9.8 m/s$^2$ of the gravitational acceleration.

In addition, the second gradient calculation unit may calculate the clutch torque-based gradient of the vehicle by using a gradient map, pre-stored in a recording device, applied with a difference value between a theoretically calculated acceleration value and an actual acceleration value calculated from the vehicle speed change amount.

Here, theoretical acceleration may be obtained by subtracting rotational force taking both clutch speed and current gear ratio into account and resistance force considering the vehicle speed, from clutch force applied with a compensation value corresponding to a current clutch torque using a compensation map, and dividing the subtracted result by vehicle weight.

The determination controller may include: a first validity determination unit determining validity of the longitudinal acceleration-based gradient provided by the first gradient calculation unit; a second validity determination unit determining validity of the clutch torque-based gradient of the vehicle by the second gradient calculation unit; and a trailer mode entry determination unit determining whether to enter a trailer mode based on a difference value between the longitudinal acceleration-based gradient and the clutch torque-based gradient when the longitudinal acceleration-based gradient and the clutch torque-based gradient are confirmed to be valid values.

Here, the first validity determination unit may determine that the longitudinal acceleration-based gradient provided by the first gradient calculation unit is valid when a vehicle state does not satisfy an initialization condition for calculating the longitudinal acceleration-based gradient.

Conditions that the initialization condition for calculating the longitudinal acceleration-based gradient is not satisfied may include some or all of the following cases: when a wheel speed state is normal; when a sensor signal state of the longitudinal acceleration measurement unit is normal; when acceleration is not an error value; and when ESP-error debouncing signal is normal.

In addition, the second validity determination unit may determine that the clutch torque-based gradient provided by the second gradient calculation unit is valid when a maintenance condition of the clutch torque-based gradient is not satisfied.

Here, conditions that the maintenance condition of the clutch torque-based gradient is not satisfied may include some or all of the following cases: when a shift lever is in R, D, or M (manual) gear; when a target gear state of a clutch is in a drive gear state; when the vehicle speed is equal to or greater than a predetermined speed; when a brake is not applied; when values of APS and engine torque are equal to or greater than predetermined values; when ABS-ACT is not working; and when engine coolant temperature is equal to or greater than predetermined temperature.

In addition, the trailer mode entry determination unit may determine that the trailer is attached, and may output a start command for entering the trailer mode when the difference value between the longitudinal acceleration-based gradient and the clutch torque-based gradient exceeds a predetermined normal range.

At this time, a timer may be activated when the difference value between the longitudinal acceleration-based gradient and the clutch torque-based gradient exceeds the predetermined normal range, and the trailer mode may be switched on when counting time counted by the timer is more than a predetermined time.

According to another aspect of the present invention as a means of solving the problem, a trailer mode determination method using a gradient, the method includes: (a) calculating a longitudinal acceleration-based gradient of a vehicle and determining whether the calculated value is valid; (b) calculating a clutch torque-based gradient of the vehicle and determining whether the calculated value is valid; (c) determining whether a calculated value of the longitudinal acceleration-based gradient is equal to or greater than a predetermined reference gradient; (d) determining whether values of vehicle speed and vehicle speed change amount are equal to or greater than predetermined values; (e) calculating a difference value between the calculated value of the longitudinal acceleration-based gradient (d1) and a calculated value of the clutch torque-based gradient (d2), and determining whether a difference value of the gradient (d1−d2) exceeds a predetermined normal range when satisfying a condition that the vehicle speed and vehicle speed change amount are equal to or greater than the predetermined values; and (f) determining that a trailer is attached to the vehicle and switching on a trailer mode when the difference value of the gradient (d1−d2) exceeds the predetermined normal range.

The Step (f) in another aspect of the present invention may include: (f-1) counting time from a point of time when the difference value of the gradient (d1−d2) exceeds the predetermined normal range by using a timer function; and (f-2) comparing a counted time value received from the timer function with a predetermined reference value and determining as the trailer mode is switched on when the counted time value exceeds the predetermined reference value.

In addition, the longitudinal acceleration-based gradient may be obtained by multiplying a difference value, calculated between longitudinal acceleration of the vehicle provided by a longitudinal acceleration measurement unit and average wheel speed change amount of the vehicle provided by a wheel speed measurement unit, by 100 and dividing the multiplied result by 9.8 m/s$^2$ of the gravitational acceleration.

In addition, the clutch torque-based gradient may be calculated by using a clutch torque gradient map, pre-stored in a recording device, applied with a difference value between a theoretically calculated acceleration value and an actual acceleration value calculated from the vehicle speed change amount.

In this case, theoretical acceleration may be obtained by subtracting rotational force taking both clutch speed and current gear ratio into account and resistance force considering the vehicle speed, from clutch force applied with a compensation value corresponding to a current clutch torque using a compensation map, and dividing the subtracted result by vehicle weight.

In addition, the step (a) may determine that the longitudinal acceleration-based gradient is valid when a vehicle state does not satisfy an initialization condition for calculating the longitudinal acceleration-based gradient.

In addition, conditions that the initialization condition for calculating the longitudinal acceleration-based gradient is not satisfied may include some or all of the following cases: when a wheel speed state is normal; when a sensor signal state of a longitudinal acceleration measurement unit is normal; when acceleration is not an error value; and when ESP-error debouncing signal is normal.

In addition, the step (b) may determine that the clutch torque-based gradient provided by a second gradient calculation unit is valid when a maintenance condition of the clutch torque-based gradient is not satisfied.

Conditions that the maintenance condition of the clutch torque-based gradient is not satisfied may include some or all of the following cases: when a shift lever is in R, D, or M (manual) gear; when a target gear state of a clutch is in a drive gear state; when the vehicle speed is equal to or greater than a predetermined speed; when a brake is not applied; when values of APS and engine torque are equal to or greater than predetermined values; when ABS-ACT is not working; and when engine coolant temperature is equal to or greater than predetermined temperature.

According to the trailer mode determination device and method according to the present invention, since the present invention uses a method of determining a trailer mode through a series of software processes using a difference value between actual gradient of the vehicle (longitudinal acceleration-based gradient) and theoretical gradient (clutch torque-based gradient), the using a separate hardware component such as a conventional dedicated cable for the trailer may be eliminated, thereby achieving an advantage of reducing cost.

In addition, since the trailer mode (whether or not the trailer is mounted) is determined on the basis of the difference value between the actual gradient (longitudinal acceleration-based gradient) and the theoretical gradient (clutch torque-based gradient) of the vehicle, an accurate determination is made possible compared to a method of measuring and determining a change in the vehicle weight, and accurate shift control may be performed according to a determination result. Therefore, behavior of the vehicle, hill climbing ability, fuel efficiency and the like may be well maintained.

DETAILED DESCRIPTION OF THE INVENTION

Figure 1:
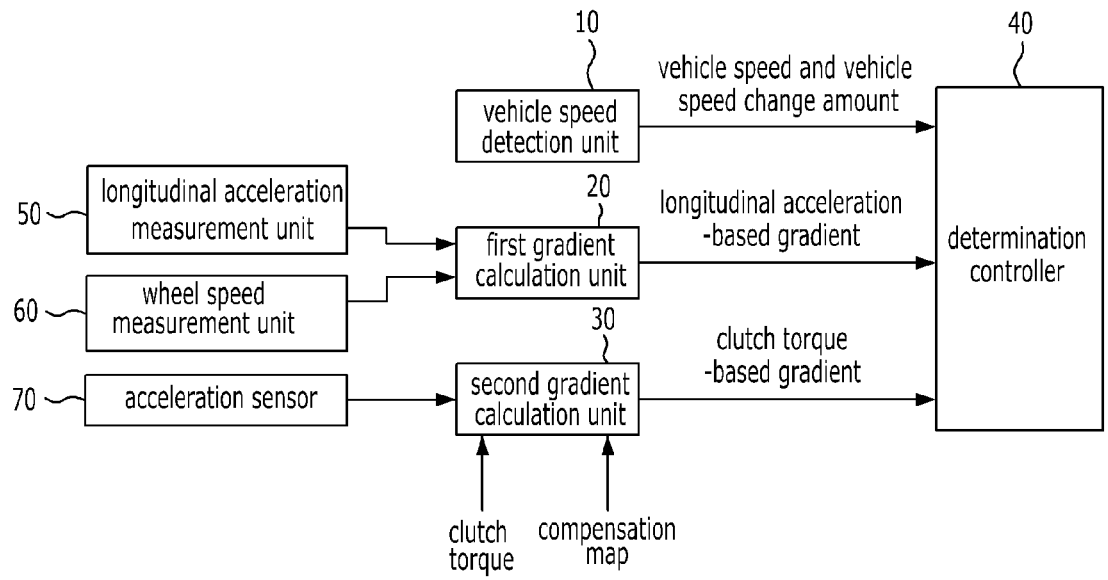
FIG. 1 is a schematic configuration diagram of a trailer mode determination device using a gradient according to an aspect of the present invention.

Hereinafter, a preferred embodiment of the present invention will be described in detail with reference to the drawings.

In describing the present invention, the terminology used herein is for the purpose of describing particular embodiments only and is not intended to be limiting. As used herein, the singular forms "a", "an", and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

It will be understood that, although the terms first, second, etc. may be used herein to describe various elements, these elements should not be limited by these terms. These terms are only used to distinguish one element, from another element.

Also, the terms "~ part", "~ unit", "module", "device" and the like mean a unit for processing at least one function or operation and may be implemented by a combination of hardware and/or software.

In the description with reference to the accompanying drawings, the same components will be given the same reference numerals and duplicate descriptions of the same components will be omitted. Also, in the following description of the present invention, detailed descriptions of known functions and components incorporated herein will be omitted when it may make the subject matter of the present invention unclear.

In the following description of the present invention, the term "clutch torque" as used herein refers to the output side torque of one of dual clutches in a vehicle equipped with a dual clutch transmission (DCT), which regulates power transmission between the engine and DCT.

Figure 2:
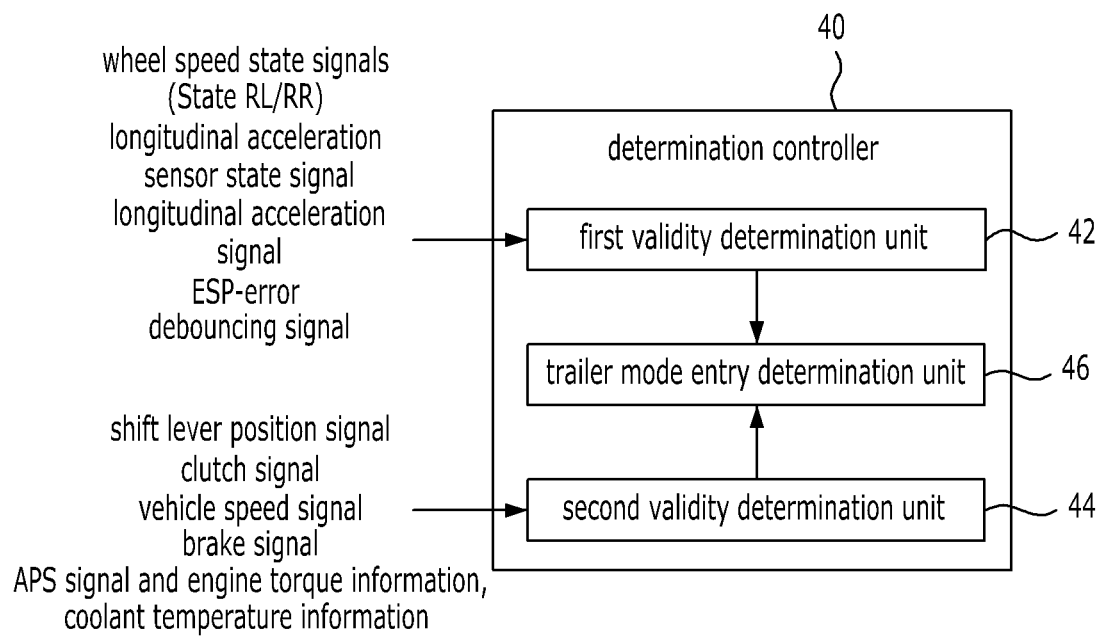
FIG. 2 is a schematic configuration diagram of a determination controller illustrated in FIG. 1.

FIG. 1 is a schematic configuration diagram of a trailer mode determination device using a gradient according to an aspect of the present invention, and FIG. 2 is a schematic configuration diagram of a determination controller illustrated in FIG. 1.

Referring to FIGS. 1 and 2, a trailer mode determination device using a gradient according to an aspect of the present invention includes: a vehicle speed detection unit 10, a first gradient calculation unit 20 for calculating a longitudinal acceleration-based gradient of the vehicle, a second gradient calculation unit 30 for calculating a clutch torque-based gradient of the vehicle, and the determination controller 40 determining whether a trailer is mounted by using information of the first and second gradient calculation units 20 and 30.

The vehicle speed detection unit 10 detects vehicle speed and vehicle speed change amount. The vehicle speed detection unit 10 also provides the determination controller 40 with information regarding the detected vehicle speed and vehicle speed change amount. The vehicle speed detection unit 10 may detect the vehicle speed and vehicle speed change amount periodically or in real time, or may detect the vehicle speed and vehicle speed change amount aperiodically under control of the determination controller 40.

As mentioned above, the first gradient calculation unit 20 calculates the longitudinal acceleration-based gradient of the vehicle. The first gradient calculation unit 20 may calculate the longitudinal acceleration-based gradient of the vehicle with both a longitudinal acceleration provided by a longitudinal acceleration measurement unit 50, or ideally by a longitudinal acceleration sensor and a calculated value of average wheel speed change amount of the vehicle provided by a wheel speed measurement unit 60. Here, longitudinal acceleration is the acceleration acting in a front-rear (or length) direction of the vehicle and may be a measured value measured through the longitudinal acceleration sensor mounted to the vehicle.

The longitudinal acceleration-based gradient calculated by the first gradient calculation unit 20 may be specifically defined, as shown in Equation 1, as a value obtained by multiplying a difference value, calculated between the low-pass filtered longitudinal acceleration provided by the longitudinal acceleration measurement unit 50 (longitudinal acceleration sensor) of the vehicle and the average wheel speed change amount provided by the wheel speed measurement unit 60 of the vehicle, by 100 and dividing the multiplied result by 9.8 m/s' of gravitational acceleration again.

$$\text{Longitudinal acceleration-based gradient} = (\text{longitudinal acceleration} - \text{average wheel speed change amount}) * (100/9.8) \quad \text{Equation 1:}$$

Here, in the above Equation 1, the longitudinal acceleration is a measured value by the longitudinal acceleration measurement unit (the longitudinal acceleration sensor), and the average wheel speed change amount may be a value derived through the following Equation 2. Also, 9.8 is the acceleration of gravity (9.8 m/s$^2$), and the number 100, which is so multiplied in the above equation, is applied as to change the longitudinal acceleration and the average wheel speed change amount in the unit of %.

$$\text{Average wheel speed change amount} = [\{(WHL\_SPD\_RL + WHL\_SPD\_RR)/2\} - \text{previous value of} \{(WHL\_SPD\_RL + WHL\_SPD\_RR)/2\}] * (1000/3600)/\Delta t \quad \text{Equation 2:}$$

Here, WHL_SPD_RL, WHL_SPD_RR represent wheel speed of rear wheels respectively detected through the wheel speed measurement unit 60, and 1000/3600 represents a value applied to convert wheel speed km/h into m/s. At means a time value as a wheel speed measurement period for calculating average wheel speed change amount.

As mentioned above, the second gradient calculation unit 30 calculates the clutch torque-based gradient of the vehicle. The second gradient calculation unit 30 utilizes a clutch torque gradient map, pre-stored in a recording device, applied with a difference value between the theoretically calculated acceleration value and the actual acceleration value calculated from the vehicle speed change amount, and thus the clutch torque-based gradient of the vehicle may be generated.

The theoretical acceleration is obtained by subtracting rotational force taking both clutch speed and current gear ratio into account and resistance force considering the vehicle speed, from clutch force applied with a compensation value corresponding to the current clutch torque using a compensation map, and dividing the subtracted result by vehicle weight. The actual acceleration may be a value obtained by reflecting a correction value (factor) to a value of vehicle acceleration (vehicle speed change amount per unit time) by an acceleration sensor 70.

Here, the compensation value applied to a clutch force calculation and the correction value used to derive the actual acceleration may be values for respectively correcting the clutch torque error and the acceleration error that vary depending on driving or environment changes for driving. Also, these compensation value and correction value may be values that are pre-recorded in the recording device using map data method in a table form as a result obtained through a pre-simulation or an iterative experiment.

The above-described longitudinal acceleration-based gradient provided by the first gradient calculation unit 20 and the above-described clutch torque-based gradient provided by the second gradient calculation unit 30 are provided to the determination controller 40. Thus, the determination controller 40 determines whether the trailer is mounted by using the received information (the longitudinal acceleration-based gradient and the clutch torque-based gradient). The shifting of a vehicle transmission is controlled by using a different shift pattern map depending on a determination result.

In addition, when the determination controller 40 satisfies a condition which is information regarding the detected vehicle speed and vehicle speed change amount provided by the vehicle speed detection unit 10 described above, specifically, a condition in which the vehicle speed and vehicle speed change amount are greater than or equal to predetermined values, the shifting of the vehicle transmission is controlled by using different shift pattern map stored in the recording device depending on a result of determining whether the trailer is mounted.

For example, in a state where the trailer mode determination condition is satisfied (in other words, in the case that the vehicle speed and vehicle speed change amount are greater than or equal to the predetermined value), the transmission is controlled by using a dedicated shift pattern map for the trailer provided in advantage for high load operation when it is determined that the trailer is mounted on the basis of the longitudinal acceleration-based gradient and the clutch torque-based gradient, otherwise the transmission is controlled by using a different shift pattern map used in normal situations.

The determination controller 40 specifically includes a first validity determination unit 42, a second validity determination unit 44, and a trailer mode entry determination unit 46 that determines whether to enter the trailer mode. The first validity determination unit 42 determines the validity of the longitudinal acceleration-based gradient provided by the first gradient calculation unit 20 described above, and the second validity determination unit 44 determines the validity of the clutch torque-based gradient provided by the second gradient calculation unit 30 described above.

The first validity determination unit 42 may determine that the longitudinal acceleration-based gradient is valid when the vehicle state does not satisfy an initialization condition for calculating the longitudinal acceleration-based gradient. On the contrary, when the vehicle state satisfies the initialization condition, it may be determined that the longitudinal acceleration-based gradient provided by the first gradient calculation unit 20 is not valid. This is because when the initialization condition is satisfied, a calculated value based on the longitudinal acceleration-based gradient is initialized and outputted as "0".

When the initialization condition for calculating the longitudinal acceleration-based gradient is not satisfied, in other words, a condition that the longitudinal acceleration-based gradient is considered valid may include some or all of the following cases: when a wheel speed state is normal; when a sensor signal state of the longitudinal acceleration measurement unit 50 is normal; when the acceleration is not the error value; and when ESP-error debouncing signal is normal. Obviously, new information may be added or some information may be omitted depending on a specification of the vehicle.

The second validity determination unit 44 may determine that the clutch torque-based gradient provided by the second gradient calculation unit 30 is valid when the vehicle state does not satisfy a maintenance condition of the clutch torque-based gradient. On the contrary, when the vehicle state satisfies the maintenance condition of the clutch torque-based gradient, it may be determined that the clutch torque-based gradient provided by the second gradient calculation unit 30 is not valid.

A condition that the clutch torque-based gradient is considered valid may include some or all of the following cases: when a shift lever is in the R, D, or M (manual) gear; when a target gear state of the clutch is in a drive gear state (a clutch state is in a gear-coupled state); when the vehicle speed is greater than or equal to a predetermined speed; when the brake is not applied; when values of APS and engine torque are greater than or equal to predetermined values; when ABS-ACT (Anti-Lock Brake System Actuator) is not working; and when engine coolant temperature is greater than or equal to a predetermined temperature. Obviously, again, new information may be added or some information may be omitted in dependence on the specification of the vehicle.

When the longitudinal acceleration-based gradient and the clutch torque-based gradient are confirmed to be valid values, the trailer mode entry determination unit 46 determines whether to enter the trailer mode on the basis of a difference value between the longitudinal acceleration-based gradient and the clutch torque-based gradient. When the difference value between the two gradients exceeds a predetermined normal range, it is determined that the trailer is mounted and a start command for entering the trailer mode is outputted.

The trailer mode may be configured to be switched on when the difference value between the longitudinal acceleration-based gradient and the clutch torque-based gradient exceeds a predetermined normal range, and a timer may be configured to be activated when counting time by the timer is greater than or equal to a predetermined time. The timer function is a kind of safety device that prevents the vehicle from entering the trailer mode when the longitudinal acceleration-based gradient is temporarily increased, such as when the vehicle climbs a slope.

Hereinafter, the trailer mode determination process performed by the trailer mode determination device using the gradient according to the above-described aspect will be described with reference to the flowcharts.

Figure 3:
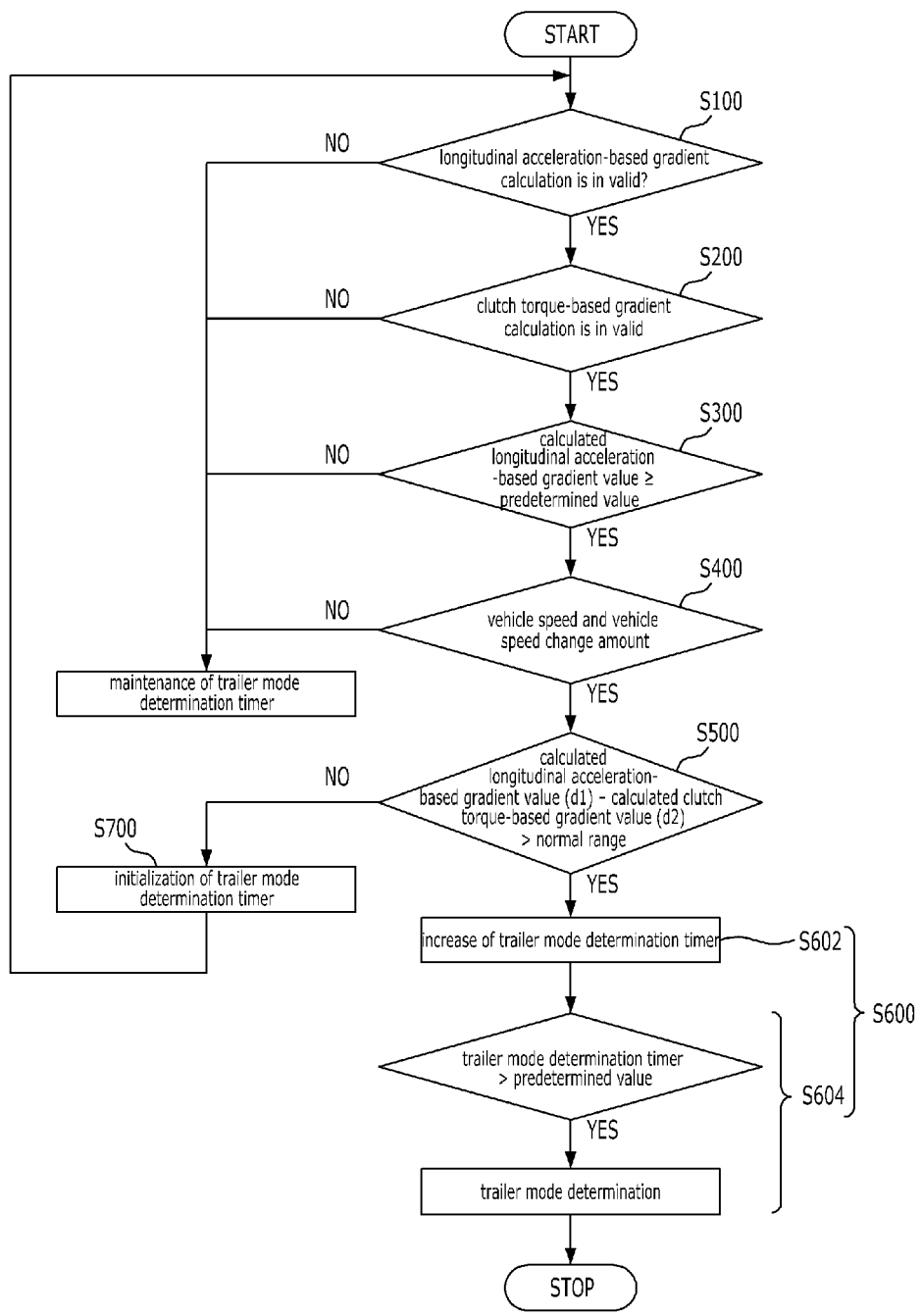
FIG. 3 is a control flowchart applied to implement a trailer mode determination method using a gradient according to another aspect of the present invention.
Figure 4:
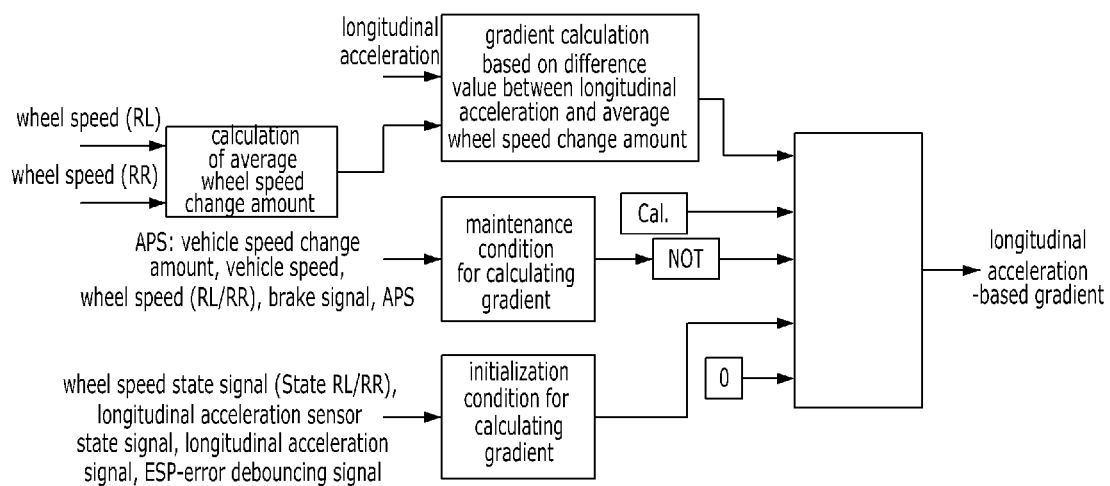
FIG. 4 is a diagram illustrating a specific algorithm for calculating a longitudinal acceleration-based gradient in step S100 of FIG. 3 and determining whether a calculated value is valid.

FIG. 3 is a control flowchart applied to implement the trailer mode determination method using the gradient according to another aspect of the present invention, and FIG. 4 illustrates a specific algorithm for calculating a longitudinal acceleration-based gradient in step S100 of FIG. 3 and determining whether the calculated value is valid. Also, FIG. 5 illustrates an algorithm applied to calculate the clutch torque-based gradient in step S200 of FIG. 3.

Figure 5:
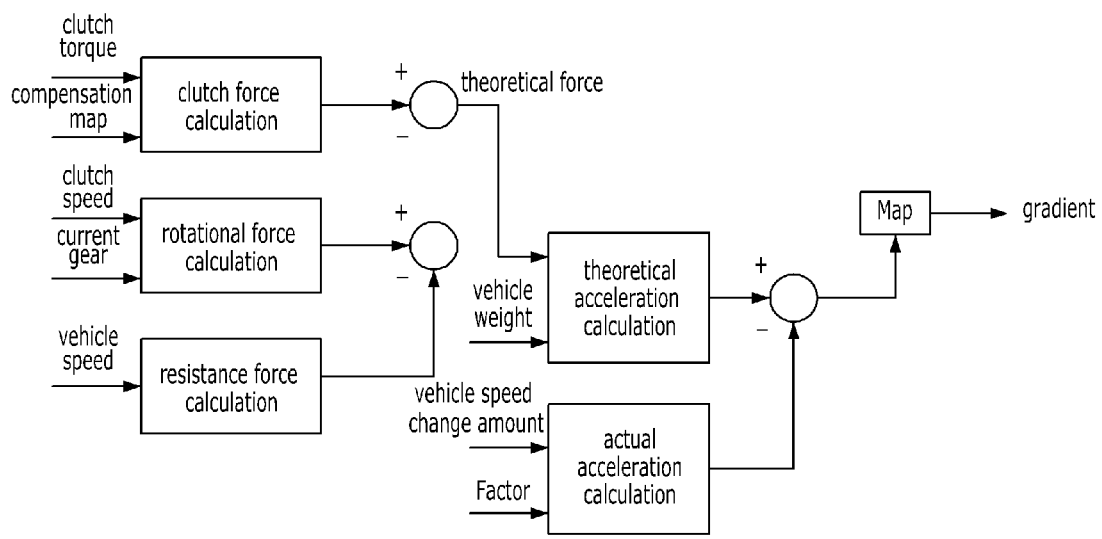
FIG. 5 is a diagram illustrating an algorithm applied to calculate a clutch torque-based gradient in step S200 of FIG. 3.

Referring to FIGS. 3 to 5, the trailer mode determination method using the gradient according to another aspect of the present invention includes, at the very beginning, step S100 calculating the longitudinal acceleration-based gradient of the vehicle and determining whether the calculated value is valid. The determination of the longitudinal acceleration-based gradient and validity may be performed through an algorithm as shown in FIG. 4 including the above-described Equation 1 and Equation 2.

The validity determination in step S100 may determine that the longitudinal acceleration-based gradient is valid when the vehicle state does not satisfy the initialization condition for calculating the longitudinal acceleration-based gradient. On the contrary, when the initialization condition is satisfied, it may be determined that the calculated longitudinal acceleration-based gradient is not valid. This is because when the initialization condition is satisfied, the calculated value based on the longitudinal acceleration-based gradient is initialized and outputted as "0".

The condition that the longitudinal acceleration-based gradient is considered valid may include some or all of the following cases: when the wheel speed state is normal; when the sensor signal state of the longitudinal acceleration measurement unit is normal; when the acceleration is not an error value; and when ESP-error debouncing signal is normal. Obviously, new information may be added or some information may be omitted depending on the specification of the vehicle.

The trailer mode determination method using the gradient according to another aspect of the present invention also includes step (S200) calculating the clutch torque-based gradient of the vehicle and determining whether the calculated value is valid. As shown in FIG. 5, the calculation of the clutch torque-based gradient utilizes the clutch torque gradient map, pre-stored in the recording device, applied with a difference value between the theoretically calculated acceleration value and the actual acceleration value calculated from the vehicle speed change amount.

The theoretical acceleration may be obtained by subtracting the rotational force taking both the clutch speed and the current gear ratio into account and the resistance force considering the vehicle speed, from the clutch force with the corresponding compensation value for the current clutch torque applied by using the compensation map, and dividing the subtracted result by the vehicle weight. The actual acceleration may be a value obtained by reflecting a correction factor to a vehicle acceleration value (vehicle speed change amount per unit time) by the acceleration sensor.

Here, the compensation value applied to the clutch force calculation and the correction value used to derive the actual acceleration may be values for respectively correcting the clutch torque error and the acceleration error that vary depending on the driving or environment changes for the driving.

In step S200, when the vehicle state does not satisfy the maintenance condition of the clutch torque-based gradient, it may be determined that the clutch torque-based gradient is valid. On the contrary, when the vehicle state satisfies the maintenance condition of the clutch torque-based gradient, it may be determined that the calculated clutch torque-based gradient is not valid.

The condition that the clutch torque-based gradient is considered valid may include some or all of the following cases: when the shift lever is in the R, D, or M (manual) gear; when the target gear state of the clutch is in the drive gear state; when the vehicle speed is greater than or equal to the predetermined speed; when the brake is not applied; when the values of the APS and the engine torque are greater than or equal to the predetermined values; when ABS-ACT is not working; and when the engine coolant temperature is greater than or equal to the predetermined temperature.

Next, Step S300 determines whether the calculated value of the longitudinal acceleration-based gradient in step S100 is greater than or equal to the predetermined reference gradient (S300). As a result of the determination, when the calculated value of the longitudinal acceleration-based gradient is greater than or equal to the predetermined reference gradient, step S400 determines whether the current vehicle state satisfies the trailer mode determination condition. When the vehicle speed and vehicle speed change amount are greater than or equal to the predetermined values, it is determined that the trailer mode determination condition is satisfied.

When the vehicle state satisfies all the determination conditions of the trailer, in other words, when the vehicle speed and vehicle speed change amount are greater than or equal to the predetermined value, the trailer mode determination method calculates the difference value between the calculated value (d1) of the longitudinal acceleration-based gradient and the calculated value (d2) of the clutch torque-based gradient in step S200 and determines whether the difference value of the gradient (d1−d2) exceeds the predetermined normal ranges (S500).

As a result of the determination in step S500, when the difference value of the gradient (d1−d2) exceeds the normal range, it is determined that the trailer is mounted and the trailer mode is switched on (S600). The trailer mode determination method counts the time from the time when the difference value of the gradient (d1−d2) exceeds the predetermined normal range by using the timer function (S602), compares the counting value with the timer function to the reference value, and determines as the trailer mode is entered when the counting value exceeds the reference value (S604).

In other words, the timer may be configured to be activated when the difference value between the longitudinal acceleration-based gradient and the clutch torque-based gradient exceeds the predetermined normal range. Also, the trailer mode is configured to be switched on when counting time by the timer is more than the predetermined time. Here, the timer function is a kind of safety device that prevents entering the trailer mode when the longitudinal acceleration-based gradient is temporarily increased, such as when the vehicle climbs a slope.

On the other hand, when the counting value through the timer function is less than the reference value in step S600, in other words, when the counting value is less than the reference value, the trailer mode determination method initializes the trailer mode timer (S700) and at the same time returns to the above-described step S100 and goes through the trailer mode determination process from the beginning.

According to the above trailer mode determination device and method according to the present invention, since the present invention uses a method of determining the trailer mode through a series of software processes using the difference value between actual gradient of the vehicle (longitudinal acceleration-based gradient) and theoretical gradient (clutch torque-based gradient), the using of a separate hardware component such as the conventional dedicated cable for the trailer may be eliminated, thereby achieving an advantage of reducing cost.

In addition, since the trailer mode (whether or not the trailer is mounted) is determined on the basis of the difference value between the actual gradient (the longitudinal acceleration-based gradient) and the theoretical gradient (the clutch torque-based gradient) of the vehicle, an accurate determination is made possible compared to the method of measuring and determining a change in the vehicle weight, and accurate shift control may be performed according to the determination result. Therefore, the behavior of the vehicle, hill climbing ability, fuel efficiency, and the like may be well maintained.

In the detailed description of the present invention, only specific embodiments thereof have been described. The present invention, however, should not be construed as being limited to only the specific modes referred to in the detailed description, but should be construed as rather covering modifications, equivalents or alternatives within the spirit and scope of the invention as disclosed in the accompanying claims.

What is claimed is:

1. A trailer mode determination device using a gradient, the device comprising:
   a vehicle speed detection unit detecting vehicle speed and vehicle speed change amount;
   a first gradient calculation unit for calculating a longitudinal acceleration-based gradient of a vehicle;
   a second gradient calculation unit for calculating a clutch torque-based gradient of the vehicle; and
   a determination controller determining whether a trailer is attached to the vehicle by using information regarding the longitudinal acceleration-based gradient calculated by the first gradient calculation unit and the clutch torque-based gradient calculated by the second gradient calculation unit, wherein when the vehicle speed and vehicle speed change amount detected by the vehicle speed detection unit are equal to or greater than a predetermined value, the determination controller controls shifting of a transmission of the vehicle by using a different shift pattern map depending on a determination result whether the trailer is attached.

2. The trailer mode determination device using a gradient of claim 1, wherein the first gradient calculation unit calculates the longitudinal acceleration-based gradient of the vehicle by multiplying a difference value, calculated between longitudinal acceleration of the vehicle provided by a longitudinal acceleration measurement unit and average wheel speed change amount of the vehicle provided by a wheel speed measurement unit, by 100 and dividing the multiplied result by 9.8 m/s$^2$ of the gravitational acceleration.

3. The trailer mode determination device using a gradient of claim 1, wherein the second gradient calculation unit calculates the clutch torque-based gradient of the vehicle by using a gradient map, pre-stored in a recording device, applied with a difference value between a theoretically calculated acceleration value and an actual acceleration value calculated from the vehicle speed change amount.

4. The trailer mode determination device using a gradient of claim 3, wherein theoretical acceleration is obtained by subtracting rotational force taking both clutch speed and current gear ratio into account and resistance force considering the vehicle speed, from clutch force applied with a compensation value corresponding to a current clutch torque using a compensation map, and dividing the subtracted result by vehicle weight.

5. The trailer mode determination device using a gradient of claim 1, wherein the determination controller comprises:
   a first validity determination unit determining validity of the longitudinal acceleration-based gradient provided by the first gradient calculation unit;
   a second validity determination unit determining validity of the clutch torque-based gradient of the vehicle by the second gradient calculation unit; and
   a trailer mode entry determination unit determining whether to enter a trailer mode based on a difference value between the longitudinal acceleration-based gradient and the clutch torque-based gradient when the longitudinal acceleration-based gradient and the clutch torque-based gradient are confirmed to be valid values.

6. The trailer mode determination device using a gradient of claim 5, wherein the first validity determination unit determines that the longitudinal acceleration-based gradient provided by the first gradient calculation unit is valid when a vehicle state does not satisfy an initialization condition for calculating the longitudinal acceleration-based gradient.

7. The trailer mode determination device using a gradient of claim 6, wherein conditions that the initialization condition for calculating the longitudinal acceleration-based gradient is not satisfied comprise some or all of the following cases: when a wheel speed state is normal; when a sensor signal state of the longitudinal acceleration measurement unit is normal; when acceleration is not an error value; and when ESP-error debouncing signal is normal.

8. The trailer mode determination device using a gradient of claim 5, wherein the second validity determination unit determines that the clutch torque-based gradient provided by the second gradient calculation unit is valid when a maintenance condition of the clutch torque-based gradient is not satisfied.

9. The trailer mode determination device using a gradient of claim 8, wherein conditions that the maintenance condition of the clutch torque-based gradient is not satisfied comprise some or all of the following cases: when a shift lever is in R, D, or M (manual) gear; when a target gear state of a clutch is in a drive gear state; when the vehicle speed is equal to or greater than a predetermined speed; when a brake is not applied; when values of APS and engine torque are equal to or greater than predetermined values; when ABS-ACT is not working; and when engine coolant temperature is equal to or greater than predetermined temperature.

10. The trailer mode determination device using a gradient of claim 5, wherein the trailer mode entry determination unit determines that the trailer is attached, and outputs a start command for entering the trailer mode when the difference value between the longitudinal acceleration-based gradient and the clutch torque-based gradient exceeds a predetermined normal range.

11. The trailer mode determination device using a gradient of claim 10, wherein a timer is activated when the difference value between the longitudinal acceleration-based gradient and the clutch torque-based gradient exceeds the predetermined normal range, and the trailer mode is switched on when counting time counted by the timer is more than a predetermined time.

12. A trailer mode determination method using a gradient, the method comprising:
(a) calculating a longitudinal acceleration-based gradient of a vehicle and determining whether the calculated value is valid;
(b) calculating a clutch torque-based gradient of the vehicle and determining whether the calculated value is valid;
(c) determining whether a calculated value of the longitudinal acceleration-based gradient is equal to or greater than a predetermined reference gradient;
(d) determining whether values of vehicle speed and vehicle speed change amount are equal to or greater than predetermined values;
(e) calculating a difference value between the calculated value of the longitudinal acceleration-based gradient (d1) and a calculated value of the clutch torque-based gradient (d2), and determining whether a difference value of the gradient (d1−d2) exceeds a predetermined normal range when satisfying a condition that the vehicle speed and vehicle speed change amount are equal to or greater than the predetermined values; and
(f) determining that a trailer is attached to the vehicle and switching on a trailer mode when the difference value of the gradient (d1−d2) exceeds the predetermined normal range.

13. The trailer mode determination method using a gradient of claim 12, wherein the step (f) comprises:
(f-1) counting time from a point of time when the difference value of the gradient (d1−d2) exceeds the predetermined normal range by using a timer function; and
(f-2) comparing a counted time value received from the timer function with a predetermined reference value and determining as the trailer mode is switched on when the counted time value exceeds the predetermined reference value.

14. The trailer mode determination method using a gradient of claim 12, wherein the longitudinal acceleration-based gradient is obtained by multiplying a difference value, calculated between longitudinal acceleration of the vehicle provided by a longitudinal acceleration measurement unit and average wheel speed change amount of the vehicle provided by a wheel speed measurement unit, by 100 and dividing the multiplied result by 9.8 m/s$^2$ of the gravitational acceleration.

15. The trailer mode determination method using a gradient of claim 12, wherein the clutch torque-based gradient is calculated by using a clutch torque gradient map, pre-stored in a recording device, applied with a difference value between a theoretically calculated acceleration value and an actual acceleration value calculated from the vehicle speed change amount.

16. The trailer mode determination method using a gradient of claim 15, wherein theoretical acceleration is obtained by subtracting rotational force taking both clutch speed and current gear ratio into account and resistance force considering the vehicle speed, from clutch force applied with a compensation value corresponding to a current clutch torque using a compensation map, and dividing the subtracted result by vehicle weight.

17. The trailer mode determination method using a gradient of claim 12, wherein the step (a) determines that the longitudinal acceleration-based gradient is valid when a vehicle state does not satisfy an initialization condition for calculating the longitudinal acceleration-based gradient.

18. The trailer mode determination method using a gradient of claim 17, wherein conditions that the initialization condition for calculating the longitudinal acceleration-based gradient is not satisfied comprise some or all of the following cases: when a wheel speed state is normal; when a sensor signal state of a longitudinal acceleration measurement unit is normal; when acceleration is not an error value; and when ESP-error debouncing signal is normal.

19. The trailer mode determination method using a gradient of claim 12, wherein the step (b) determines that the clutch torque-based gradient provided by a second gradient calculation unit is valid when a maintenance condition of the clutch torque-based gradient is not satisfied.

20. The trailer mode determination method using a gradient of claim 19, wherein conditions that the maintenance condition of the clutch torque-based gradient is not satisfied comprise some or all of the following cases: when a shift lever is in R, D, or M (manual) gear; when a target gear state of a clutch is in a drive gear state; when the vehicle speed is equal to or greater than a predetermined speed; when a brake is not applied; when values of APS and engine torque are equal to or greater than predetermined values; when ABS-ACT is not working; and when engine coolant temperature is equal to or greater than predetermined temperature.

* * * * *